Patented May 9, 1933

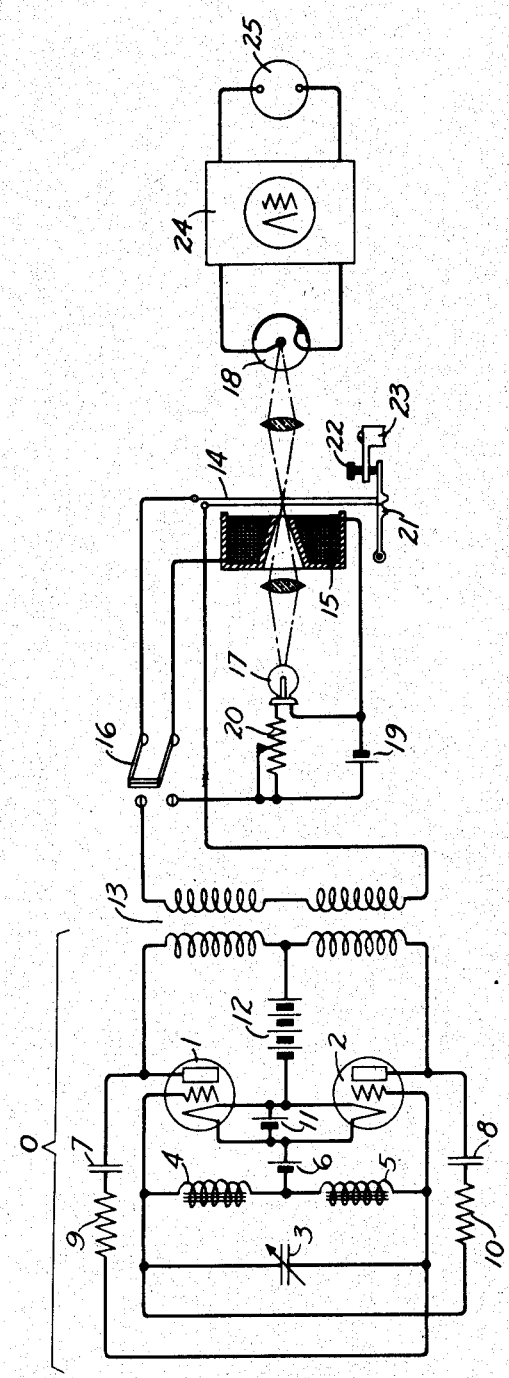

1,907,704

UNITED STATES PATENT OFFICE

WILLIAM H. ANDERSON, OF HOLLYWOOD, CALIFORNIA, ASSIGNOR TO BELL TELEPHONE LABORATORIES, INCORPORATED, OF NEW YORK, N. Y., A CORPORATION OF NEW YORK

METHOD OF ADJUSTING TRANSLATING DEVICES

Application filed April 30, 1930. Serial No. 448,672.

This invention relates to a method of and system for adjusting translating devices such as light valves used in the recording of sound.

It is an object of this invention to provide a method of and a system for accurately adjusting and preparing light valves for efficient operation.

A feature of the invention lies in the provision of a system wherein means are provided for accurately indicating the amplitude of deflection of the filaments of a light valve for a certain applied tension and frequency.

The principle of operation of such a light valve is disclosed in Patent 1,638,555 to E. C. Wente wherein a pair of electrical conductors or filaments are arranged in a plane at right angles to a magnetic field so as to define a light transmitting slot. In the operation of the valve, sound modulated currents are supplied to those electrical conductors to cause them to move relatively to each other, thus varying the width of the slot and the amount of light transmitted. In order that the sound record in reproduction may reproduce the sounds exactly as applied to the transmitter in recording, it is necessary that the filaments of the light valve respond faithfully to the sound modulated currents applied during recording.

Distortion in the sound record frequently occurs, due principally to the resonant effects in the filaments of the light valve. This resonance of the filaments and consequently inefficient response to the applied sound modulated currents occurs when some of the component frequencies present in the original sound correspond to the natural period of vibration of the filaments. This natural period of vibration of the filament can be regulated by increasing or decreasing the tension applied to the filaments. In accordance with this invention a method of preparing light valves for operation consists in applying an electric current of increasing frequency, in successive steps, to the filaments and adjusting the tension applied to the filaments at each step to give maximum deflection. This operation is continued to a point at which the frequency required to effect resonance of the filaments is considerably above the range of frequency applied during the recording of sound. A valve so adjusted will have a fairly high and even frequency-response-characteristic to frequencies below this resonant frequency.

The necessity for applying frequency and tension to the filaments in increasing steps occurs because of the mechanical properties of the material of the filaments. It can readily be seen that any excess of tension beyond the elastic limit of the filaments would cause them to break. For this reason means must be provided for accurately measuring the response of the filaments to the applied tension and frequency.

It has been the practice to view the filaments through a microscope to determine their maximum amplitude of deflection for each applied tension and frequency. However, it has been found that this method does not produce a measurement of deflection within the degree of precision required.

In accordance with this invention means are provided for accurately measuring the response of the filaments to the applied tension and frequency. More specifically, there is provided a means for applying a current of given frequency to the filaments and a beam of light of constant intensity for projection to the filaments. A light sensitive device receives light from the light source in accordance with the deflection of the filaments, and an indicating means electrically connected to the light sensitive device provides a measure of deflection of the filaments.

The figure is a diagrammatic showing of a light valve and the devices employed in its adjustment.

In the figure an oscillator O composed of two electrical space discharge devices 1, 2, arranged in push-pull relationship, supplies a constant frequency current to the light valve filaments. The frequency of oscillation is determined by a tuned circuit comprising a variable condenser 3 and two inductance coils 4, 5, connected in the grid circuits of the space discharge devices. The grids of the space discharge tubes are polarized for operation on a desired portion of their characteristic slopes by means of a battery 6. Energy is fed back from the plate circuits to the grid circuits of the tubes in the paths comprising blocking condensers 7, 8 and resistances 9, 10. The resistances are provided to limit the amplitude of the energy fed back. The filaments of the tubes are heated by means of a battery 11. Plate voltage is supplied by means of a battery 12. In the output circuit of the vacuum tube oscillator is provided a transformer 13 for supplying energy of the oscillator frequency to light valve filaments 14 located in the field of a light valve coil 15. A switch 16 may be used to disconnect the light valve filament circuit from the oscillator output circuit and to open in the circuit of the field magnet of the light valve. The source of light of uniform intensity 17 projects rays by means of a lens system to the light valve filaments 14, and an image of the filaments is projected by means of another lens system, to a photoelectric cell 18. The power for the light source and for the light valve coil is supplied by battery 19. The intensity of the lamp 17 may be controlled by means of a variable resistance 20.

Tension is applied to the filaments by means of a tensioning device comprising an arm 21 around which the filaments are passed and a screw 22 mounted in a block 23 for raising or lowering the arm 21 thereby decreasing or increasing the tension applied to the filaments 14. A tensioning device here shown is merely an illustrative showing of one of many types of tensioning devices which may be employed.

A photoelectric cell 18 is connected to the input of an amplifier 24. The current obtained from the last stage of this amplifier is supplied to a volume indicator 25.

In the operation of the system, the frequency of the oscillator output is increased in successive steps by means of the variable condenser 3 and the tension on the filaments of the light valve is adjusted for each step until maximum deflection of the light valve filaments is obtained as noted on the volume indicating device 25. The variable condenser 3 is calibrated with a scale from which direct readings as to frequency are obtainable. As the filaments move relatively to each other when a current is supplied to them, the amount of light reaching the photoelectric cell will depend upon the extent of deflection of the light valve filaments. At their resonant frequency there will be a maximum deflection of the light valve filaments causing a maximum amount of light to reach the light sensitive cell which will therefore produce the maximum indication on the indicating device. In this manner, the resonant point of the light valve filaments may be accurately and conveniently adjusted to a point which is without the range of frequencies applied during recording, thereby eliminating the possibility of distortion in the sound record due to inefficient response of the light valve to all of the impressed frequencies applied during operation.

What is claimed is:

1. A method of adjusting a filament light valve for efficient operation which comprises applying to the filaments of said light valve an electric current of a frequency beyond the frequency range to be applied to said valve under actual working conditions, increasing the tension applied to said filaments in successive steps, and noting by electrical means when maximum deflection of said filament is obtained.

2. A method of adjusting a filament light valve for efficient operation which comprises applying to the filaments of said light valve an electric current of a frequency beyond the frequency range to be applied to said valve under actual working conditions, increasing the tension applied to the filaments in successive steps, illuminating said filaments, projecting an image of said filaments to a photoelectric indicating device and reading the amplitude of deflection of said filaments for each successive tension step as indicated by said indicating device until maximum deflection of said filaments is obtained.

3. A method of adjusting a filament light valve for efficient operation which comprises first, supplying to the filaments of said valve an alternating current of known frequency within the range of frequencies to be supplied to said valve under actual working conditions, projecting an image of said filaments to a photoelectric indicating device, increasing the tension applied to said filaments in successive steps until maximum deflection is noted on said indicating device and thereafter supplying a current of successively increased frequency to said filaments in successive steps until a frequency is reached beyond the range of frequencies to be supplied under actual working conditions and increasing the tension applied to said filaments at each successively increased frequency step until maximum deflection of said filaments is noted for each successive frequency step.

In witness whereof, I hereunto subscribe my name this 11th day of April 1930.

WILLIAM H. ANDERSON.